(12) United States Patent
Koitabashi

(10) Patent No.: US 6,379,000 B1
(45) Date of Patent: *Apr. 30, 2002

(54) METHOD OF FORMING IMAGE AND APPARATUS OF THE SAME

(75) Inventor: Noribumi Koitabashi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,940

(22) Filed: Dec. 22, 1998

(30) Foreign Application Priority Data

Dec. 26, 1997 (JP) .............................. 9-361461
Dec. 22, 1998 (JP) ............................. 10-364571

(51) Int. Cl.$^7$ .............................. G01D 11/00
(52) U.S. Cl. ......................... 347/100; 347/96
(58) Field of Search .................. 347/100, 95, 84, 347/96; 106/247, 31.58, 31.59, 31.89, 31.86

(56) References Cited

U.S. PATENT DOCUMENTS

| 5,133,803 A | 7/1992 | Moffatt | 106/25 |
| 5,746,818 A | * 5/1998 | Yatake | 106/31.86 |
| 6,007,182 A | * 12/1999 | Matsubara et al. | 347/43 |
| 6,012,809 A | * 1/2000 | Ikeda et al. | 347/101 |
| 6,036,759 A | * 3/2000 | Wickramanayake et al. | 106/31.89 |

FOREIGN PATENT DOCUMENTS

| EP | 0 583 096 A1 | 2/1994 | |
| EP | 0583096 A1 | * 7/1994 | |
| EP | 0 767 224 A2 | 4/1997 | |
| JP | 02055184 A | * 2/1990 | 347/100 |

* cited by examiner

*Primary Examiner*—John Barlow
*Assistant Examiner*—Manish S Shah
(74) *Attorney, Agent, or Firm*—Fitzpatrick, Cella, Harper & Scinto

(57) ABSTRACT

In ink-jet printing, in order to improve fixation without using a means such as a heater, etc. even in the case of using an ink with a slow penetration speed, black ink discharged from one head is made to be relatively low penetrative, while a processing solution, which is discharged from the other head and insolubilize dye of the above black ink, is made to be relatively high penetrative. When characters, etc. are printed on recording paper, the black ink and the processing solution thus coalesce on the recording paper, and the penetrability of the mixed solution becomes a given level or higher, and this permits to accelerate the penetration and fixation.

44 Claims, 8 Drawing Sheets

METHOD OF FORMING IMAGE AND APPARATUS OF THE SAME

This application is based on Japanese Patent Application No. 9-361461 (1997) filed Dec. 26, 1997 and Japanese Patent Application No. 10-364571 (1998) filed Dec. 22, 1998, the contents of which are incorporated herein by reference.

BACKGROUND OF THE INVENTION

1. Field of the Invention

This invention relates to a method for forming an image and an apparatus for forming the same, and particularly to fixing technology in a case of forming an image by using ink and a processing solution to insolubilize the ink.

2. Description of the Related Art

In ink-jet printing technology for performing printing by using a solution such as the ink of the present invention, etc., fixation of the ink after printing is one of important subjects. If the fixation is poor, there is a fear of inconvenience in handling printed matters outputted from a printer or a fear of staining other printed matters when they are arranged to be laminated for being put into storage.

As a means for improving such fixing, an accelerator to evaporate solvent such as water content in the ink, etc. by using a heating means such as a heater or the like is known. The use of such a heating means permits an across-the-board or better improvement in fixation of ink with any penetration speed from a high penetrability to a low penetrability.

However, in an arrangement of using a heater, a total power consumption of a printer becomes relatively high. Especially, when a higher speed printing is desired, a the shorter time is required for fixing and more heat has to be supplied, and this results in an especially large power consumption. Further, heating by heater is performed on the printing medium during feeding or conveyance, but if the heater is arranged along the conveyance path, a printer is upsized more and this is not always a suitable arrangement from a down-sizing point of view for the equipment.

As opposed to this, it is also known that an ink with a high penetrability is used and fixation of the ink itself is thereby improved.

SUMMARY OF THE INVENTION

The object of the present invention is to solve at least one of the following problems. Namely, they are:

to provide a new image-forming technology,
  to improve fixation without using a means such as a heater, etc. even when an ink with a slow penetrability is used, and
  to rapidly fix an ink containing a color material such as black, etc. while achieving a high optical density.

In a first aspect of the present invention, there is provided a method for forming an image comprising the step of:

forming an image by using each of different plural droplets,
wherein a concentration of a surface-active agent in a droplet, into which the different plural droplets for constituting the image to be formed have coalesced on a printing medium surface, is the critical micell concentration of the surface-active agent in pure water or higher.

Here, a concentration of a surface-active agent in at least one of the different plural droplets may be less than the critical micell concentration of the surface-active agent in pure water, and a concentration of a surface-active agent in at least one of another droplets may be the critical micell concentration of the surface-active agent in pure water or higher.

The surface-active agents may be ethylene oxide-2, 4, 7, 9-tetramethyl-5-decine-4, and 7-diol, and droplets, in which concentrations of the surface-active agents are the critical micell concentrations of the surface-active agents in pure water or higher, may have contents of 0.7% or higher in the droplets corresponding to the surface-active agents.

In a second aspect of the present invention, there is provided a method for forming an image comprising the step of:

forming an image by using each of different plural droplets,
wherein a surface tension of a droplet, into which the different plural droplets for constituting the image to be formed have coalesced on a printing medium surface, is less than 35 dyne.

Here, the surface tension of at least one of the different plural droplets may be less than 35 dyne, and the surface tension of at least one of another droplets may be not less than 35 dyne.

In a third aspect of the present invention, there is provided a method for forming an image comprising the step of:

forming an image by using each of different plural droplets,
wherein Ka value of penetration speed of a droplet, into which the different plural droplets for constituting the image to be formed have coalesced on a printing medium surface, is not less than 5 $[ml/m^2 \cdot msc^{1/2}]$.

Here, Ka value of at least one of the different plural droplets may not be less than 5 $[ml/m^2 \cdot msec^{1/2}]$, and Ka value of at least one of another droplets may be less than 5 $[ml/m^2 \cdot msec^{1/2}]$.

In any of the above aspects of the present invention, each of the different plural droplets may be an ink droplet containing color material.

The different plural droplets may contain processing solution droplets to insolubilize the color materials in the ink droplets and addition of the processing solution droplets onto printing medium may be performed later than at least one of the ink droplets.

The ink droplets may contain ink droplets mainly having dyes as color materials.

The ink droplets may contain ink droplets mainly having pigments as color materials.

The ink droplets may contain ink droplets mainly having dyes as color materials and ink droplets mainly having pigments as color materials.

The ink droplets mainly having pigments may contain dispersing agent for dispersing the pigments.

The ink droplets mainly having pigments may contain self-dispersing type pigments.

In a fourth aspect of the present invention, there is provided a method for forming an image comprising the step of:

forming an image by adding at least one of the ink droplets before adding processing solution droplets to insolubilize color materials in the ink droplet.
wherein a concentration of a surface-active agent in a droplet, into which at least one of the ink droplets and the processing solution droplets have coalesced on a surface of a printing medium constituting an image to be formed, is not less than the critical micell concentration of the surface-active agent in pure water.

In a fifth aspect of the present invention, there is provided a method for forming an image comprising the step of:

forming an image by adding at least one of the ink droplets before adding processing solution droplets to insolubilize color materials in the ink droplet, wherein a surface tension of the droplet, into which at least on the one of ink droplets and the processing solution have coalesced on a surface of a printing have coalesced on a surface of a printing medium constituting an image to be formed, is less than 35 dyne.

In a sixth aspect of the present invention there is provided a method for forming an image comprising the step of:

forming an image by adding at least one ink droplet before adding processing solution droplets to insolubilize color materials in the ink droplet, wherein Ka value indicating a penetration speed of the droplet, into which at least the one ink droplet and the processing solution have coalesced on a surface of a printing medium constituting an image to be formed, is not less than $5[ml/m^2 \cdot msec^{1/2}]$.

In a seventh aspect of the present invention, there is provided a method for forming an image comprising the step of:

forming an image by adding at least one ink droplet before adding processing solution droplet to insolubilize color materials in the ink droplets and then, further adding at least another ink droplet, wherein a concentration of a surface-active agent in the droplet, into which at least the one ink droplet and the processing solution have coalesced on a surface of a printing medium constituting an image to be formed, is not less than the critical micell concentration of the surface-active agent in pure water.

In an eighth aspect of the present invention, there is provided a method for forming an image comprising the step of:

forming an image by adding at least one ink droplets before adding processing solution droplets to insolubilize color materials in the ink droplet and then, further adding at least another ink droplet, wherein a surface tension of the droplet, into which at least the one ink droplet and the processing solution have coalesced on a surface of a printing medium constituting an image to be formed, is less than 35 dyne.

In a ninth aspect of the present invention, there is provided a method for forming an image comprising the step of:

forming an image by adding at least one ink droplets before adding processing solution droplets to insolubilize color materials in the ink droplet and then, further adding at least another ink droplet, wherein Ka value indicating a penetration speed of the droplet, into which at least the one ink droplet and the processing solution have coalesced on a surface of a printing medium constituting an image to be formed, is not less than $5[ml/m^2 \cdot msec^{1/2}]$.

In a tenth aspect of the present invention there is provided an image forming apparatus comprising:

means for forming an image by using discharging portions for discharging each of different plural droplets and discharging the droplets onto a printing medium from the discharging portions, wherein the concentration of the surface-active agent in the droplet, into which the different plural droplets have coalesced on a surface of a printing medium constituting an image to be formed, becomes not less than the critical micell concentration of the surface-active agent to pure water.

In an eleventh aspect of the present invention, there is provided an image forming apparatus comprising:

means for forming an image by using discharging portions for discharging each of different plural droplets and discharging the droplets onto a printing medium from the discharging portions, wherein the surface tension of the droplet, into which the different plural droplets have coalesced on a surface of a printing medium constituting an image to be formed, is less than 35 dyne.

In a twelfth aspect of the present invention, there is provided an image forming apparatus comprising:

means for forming an image an image by using discharging portions for discharging each of different plural droplets and discharging the droplets onto a printing medium from the discharging portions, wherein Ka value indicating a penetration speed of the droplet, into which the different plural droplets have coalesced on a surface of a printing medium constituting an image to be formed, is not less than $5[ml/m^2 \cdot msec^{1/2}]$.

According to the above arrangement, a critical micell concentration, a surface tension, and Ka value, which represent a penetrability of a droplet of different plural droplets such as those of ink, processing solution, etc. joined with a printing medium, have predetermined values or higher of a penetrability, therefore, even if some of the individual droplets have a low penetrability, the penetration of the joined droplets is accelerated.

Thus, even if ink of a low penetrability is used for improving optical density value (OD value) or suppressing feathering, a high penetrability is shown for the combined droplets and the fixation is not inhibited.

The above and other objects, effects, features and advantages of the present invention will become more apparent from the following description of the embodiments thereof taken in conjunction with the accompanying drawings.

DETAILED DESCRIPTION OF THE PREFERRED EMBODIMENTS

The embodiments in accordance with the present invention have been obtained as the results of the experiments or analyses by the inventor of the present invention.

When printing was carried out with a black (Bk) ink on a sheet of ordinary paper and the behavior was observed, an ink with a slow penetration almost remained in a state of a droplet on the paper in spite of the elapsed, however, as soon as printing was done where a droplet with a high penetrability superimposed on the former droplet, the two kinds of solution mixed together, and penetrated in the paper within a relatively short time.

Providing various solutions with high penetrabilities by admixing various concentrations of nonionic surface-active agent such an ethylenoxide-2, 4, 7, 9-tetramethyl-5-decyne-4, 7-diol (hereinafter also called "acetylenol" A brand name manufactured by Kawaken Fine Chemical Co., Ltd.), and printing with acetylenol was done using Bk ink to form a solid printed image, and fixing time was measured. In this case, when analysis was made by varying a discharge volume of Bk ink and that of high penetrability solution for overprinting later, the fixing time was about the same as that for discharging the same volume of the prior mixture of Bk ink and a high penetrability solution which were discharged separately above.

Namely, it is presumed that when they were discharged separately, the two kinds of the solutions were mixed immediately and changed into one solution which had a uniform and approximately the same penetrability as a previous mixture of them, and penetrated.

Figure 1:
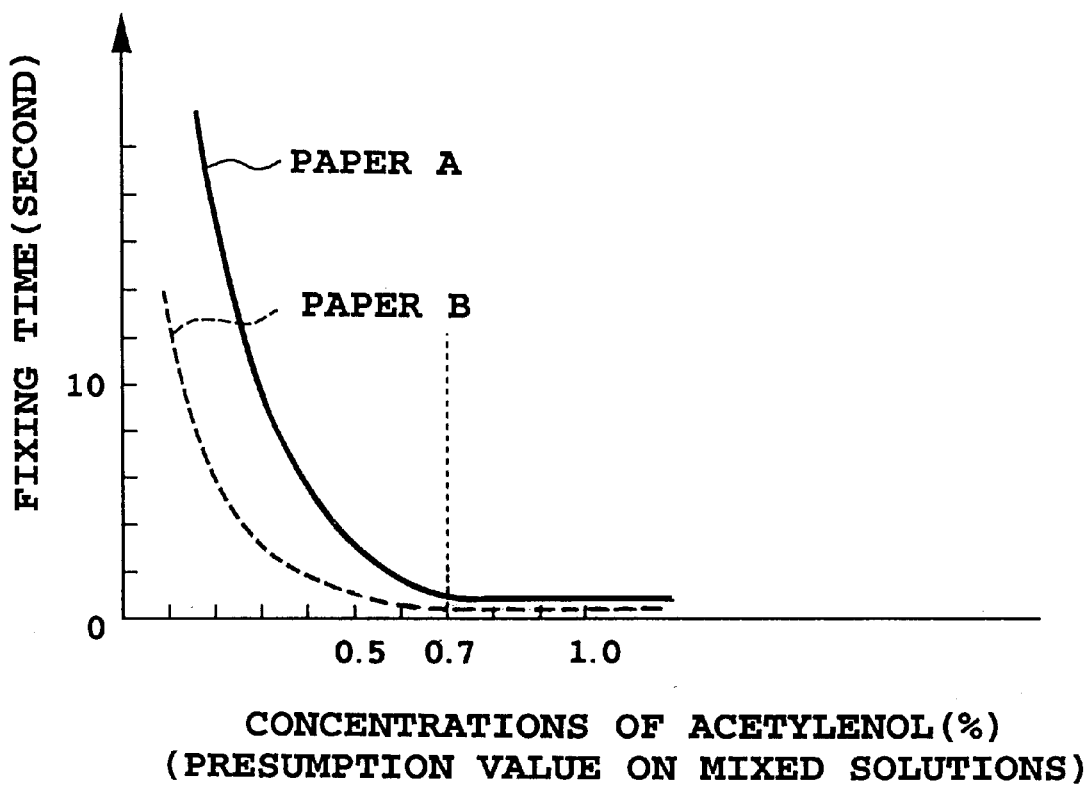
FIG. 1 is a chart showing a relationship between a concentration of acetylenol contained in an ink, etc. and a fixing time to a printing medium for the ink.

Here, a further study shown in FIG. 1 showed that when mixed solutions of various concentrations of acetylenol were added onto paper A with relatively poor fixation and paper B with relatively good fixation, fixation is greatly accelerated at a concentration of 0.7% or higher which is the critical micell concentration of water, as illustrated by a solid line and a broken line. In this case, paper A had a fixing time of about 1 second or less, while paper B had 0.5 seconds or less.

Namely, the inventor of the present invention has originated a new idea of forming an image not by one droplet image forming but by different plural droplets of compound ink on a printing medium. Namely, this new method of image forming has a concentration of a surface active agent in the compound ink droplets that is equal to a critical micell concentration in pure water or higher.

Furthermore, the inventor of the present invention takes notice of ink in ink-jet printing technology wherein one dot is generally formed from a plurality of ink droplets and intends to positively make use of this method to control the penetrability of a mixed solution compounded and finally obtained.

As stated above, an embodiment of the present invention is to use a plurality of different kinds of solutions, to mix them on a printing medium, and to make the mixed solution have a predetermined penetrability or higher. Specifically each of a plurality of the above-mentioned solutions to be mixed may basically have arbitrary penetrability and has only to reveal a predetermined penetrability or higher when they are compounded into one mixed solution. For example, some kinds of the solutions to be mixed may have the predetermined penetrability or a lower one, and the other kinds of the solutions may reveal the predetermined penetrability or a higher one.

Here, concerning "kind" of a solution in this specification, it is defined as being "different kind" when components or, more broadly, characteristics are different from each other. For example, processing solution to insolubilize an ink and its color material, pigment ink and dye ink, further, ink containing dispersing agent (hereinafter called "pigment ink with dispersing agent"), and self-dispersing type ink containing no dispersing agent (hereinafter called "ink without dispersing agent", respectively, may comprise each solution to be mixed in accordance with this embodiment. Further, different color inks and inks containing different components may comprise the above-mentioned solutions to be mixed, respectively. Furthermore, an ink containing pigment and less component ratio of dye, and reversely, an ink containing dye and a less component ratio of pigment may also comprises each of the above-mentioned solutions to be mixed, respectively.

Penetrability mentioned in this specification will briefly be described in the following.

When penetrability is expressed by an ink volume per 1 $m^2$, it is known that a penetration amount of ink (a unit : $ml/m^2 = \mu m$) can be expressed by Bristow's formula as shown below.

[Formula 1:] $V = Vr + Ka(t-tw)^{1/2}$ wherein, Li>tw

Immediately after droplets of ink have landed on a surface of a printing medium, the droplets of ink are mostly absorbed in rugged parts on the surface and little is permeated into the printing medium. This penetration time is expressed by tw (a wet time) and an absorption volume in the rugged part is expressed by Vr. When an elapse of time after deposition of the droplets of the ink exceeds tw, penetration volume is increased in the volume proportional to (½)th power of the exceeding time (t–tw). Ka is a proportional factor of this increment and shows a value according to a penetration speed.

Figure 2:
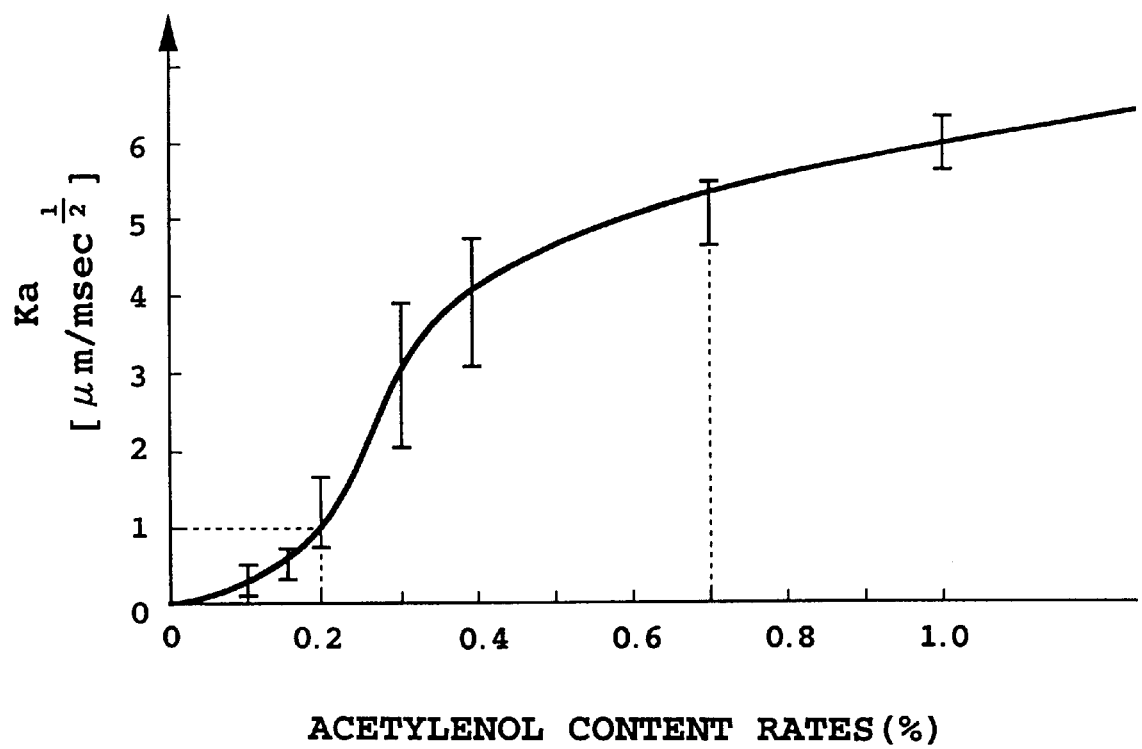
FIG. 2 is a chart showing a relationship between a concentration of acetylenol and K-value representing a penetration speed.

FIG. 2 shows values of the proportional factor Ka corresponding to content ratios of acetylenol in an ink obtained by experiments.

Ka values were measured by using a solution dynamic penetrability measuring device S (made by Toyo Seiki Seisakusho) in accordance with the Bristow method. In these experiments, PB paper of Canon Co., Ltd., who is the applicant of the present invention, was used as a printing medium (recording paper). This PB paper is usable not only for a copier or a laser beam printer (LBP) using an electrophotographic method, but also for printing using an ink-jet recording method.

Further, a similar result could be obtained using PPC paper, an electro-photographic paper of Canon Co., Ltd.

FIG. 2 shows a curve on which Ka values are increasing (ordinate axis) with increasing acetylenol concentration (axis abscissa). The proportional factor Ka is determined according to the percentage of acetylenol. Consequently, a penetration speed of ink substantially depends on a concentration of acetylenol. Further, the line segments crossing the curve and in parallel with the ordinate axis show ranges of dispersing of the measurement results.

Figure 3A:
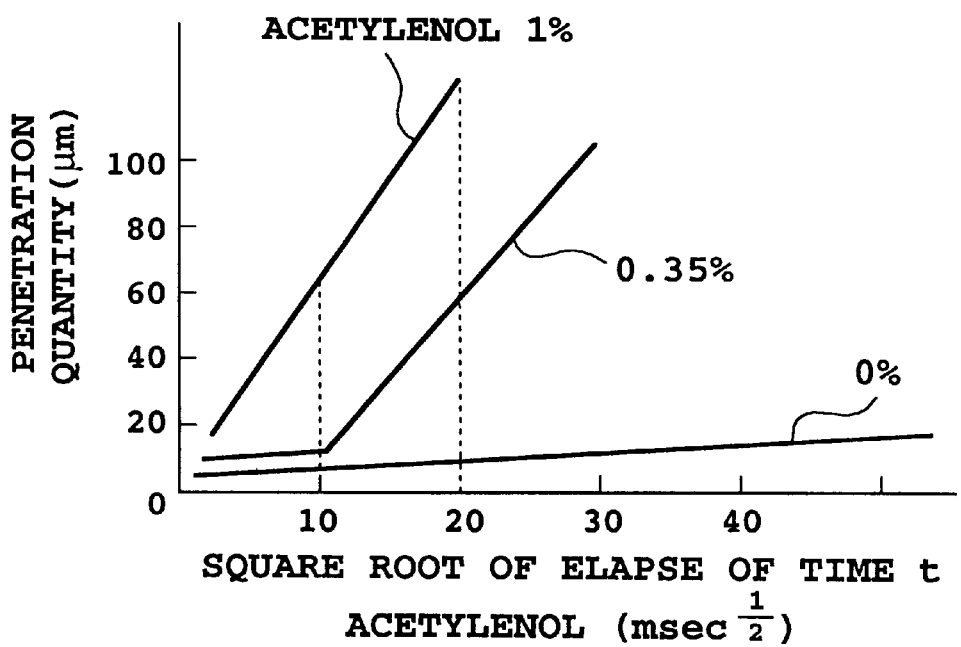
FIGS. 3A and 3B are characteristic curves showing relationships between a penetration quantity and an interval of time.
Figure 3B:
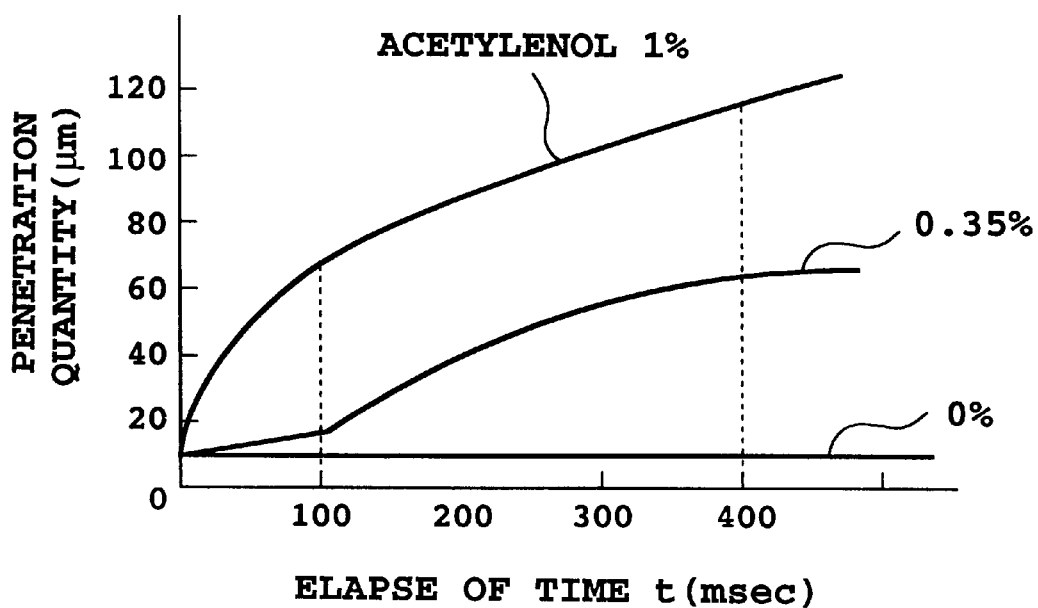

FIGS. 3A and 3B show characteristic curves of a relationship between penetration quantity of ink and penetration speed and shows results of the experiments on a recording paper of 64 $g/mm^2$ weight, about 80 $\mu m$ thickness and about 50% percentage of voids.

In FIG. 3A, the abscissa represents square root of an elapse of time t ($msec^{1/2}$), and in FIG. 3B, the abscissa represents the elapse of time t (msec). Further, in both figures, the ordinate represents penetration amount ($\mu m$), and curves are in the case of 0%, 0.35% and 1% acetylenol content, respectively.

As shown in both figures, the higher the acetylenol content, the higher the penetration amount of ink during the elapsed time, namely, the higher the penetrability. In the graphics shown in FIG. 3, such a tendency can be seen that the higher the content of acetylenol, the shorter the wet time tw becomes, and also, the higher the content of acetylenol the higher the penetrability, even during the time before reaching tw.

In the case of an ink containing no acetylenol (content is 0%), the ink is a low or poorly permeable ink. Further, in the case that acetylenol is mixed to have a 1% content, the ink has a property of permeating into recording paper in a short time and is considered a highly permeable ink as will be specified later. And, the ink mixed with 0.35% content of acetylenol has a property of an intermediate, semi-permeable ink between the two.

TABLE 1

| | Ka value ($ml/m^2 \cdot msec^{1/2}$) | Acetylenol content (%) | Surface tension (dyne/cm) |
|---|---|---|---|
| Poorly permeable ink | less than 1.0 | less than 0.2 | 40 or larger |
| Semi-permeable ink | 1.0 or more but less than 5.0 | 0.2 or more but less than 0.7 | 35 or larger but smaller than 40 |
| Highly permeable ink | 5.0 or more | 0.7 or more | smaller than 35 |

The above-mentioned table 1 shows Ka values, acetylenol contents (%), and surface tensions (dyne/cm) to "poorly permeable ink", "semi-permeable ink", and "highly permeable ink", respectively. The higher the Ka value is, the higher the penetrability of each ink a recording paper printing medium becomes. Namely, the smaller the surface tension the higher the penetrability.

The Ka values in Table 1 were, as described above, obtained from the measurements by using a solution dynamic penetrability test device S (made by Toyo Seiki Seisakusho) in accordance with the Bristow method. In the experiments, said PB paper of Canon Co., Ltd. was used as recording paper. Further, similar results could be obtained on PPC paper of said Canon Co., Ltd.

Here, the ink specified as "highly permeable ink" has 0.7% or more acetylenol content and this is in the range of penetrability in which an excellent result could be obtained as described above.

Here, it is known that as a condition for containing a surface active agent in a solution, there is a critical micell concentration (hereinafter also called "CMC") of the surface active agent for the solution. This critical micell concentration is a concentration when a concentration of a surface active agent solution is increasing and suddenly tens of molecules are associated with each other to form a micell. Acetylenol contained in the above-described ink for increasing penetrability is a kind of surface active agent, and a critical micell concentration exists for this acetylenol as well according to solutions.

Figure 4:
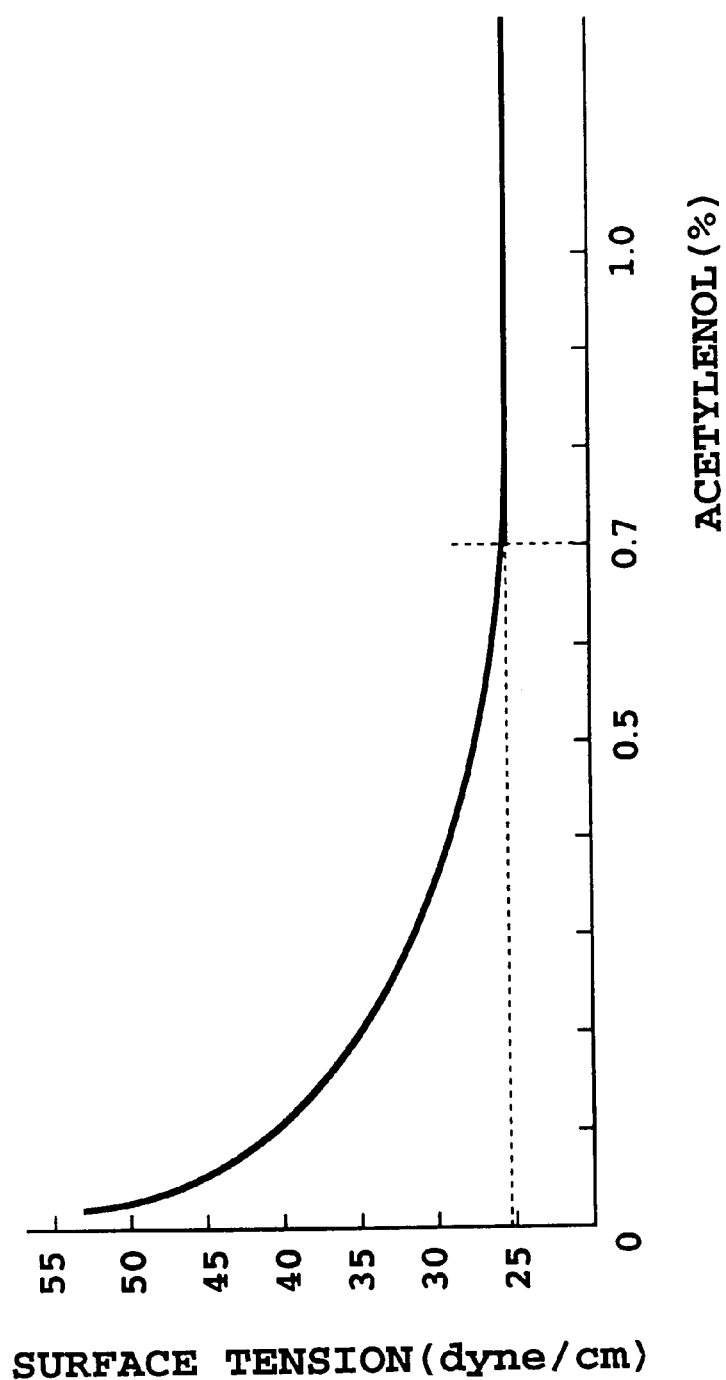
FIG. 4 is a chart showing a relationship between a concentration of acetylenol and a surface tension.

FIG. 4 is a characteristic curve showing the relationship between the surface tension and the concentration was prepared of acetylenol to water was prepared. Since there is no reduction in the surface tension when a micell is formed, it is apparent from the figure that the critical micell concentration of acetylenol to pure water is about 0.7%. And, comparing the CMC shown by the figure with the above Table 1, it is apparent that the "highly penetrable ink" contains acetylenol of its CMC to pure water or higher.

Based on the above definitions of penetrability, etc., several embodiments in accordance with the present invention will be described below.

EMBODIMENT 1

The embodiment is to perform printing by using an ink containing a predetermined color material such as dye or pigment, etc. and a processing solution to make this color material insoluble. Namely, by discharging the above-mentioned ink at first and then adding the processing solution, a coalescent mixed solution is formed on a printing medium and the concentration of the surface active agent in the solution corresponds to the CMC of the surface active agent in pure water or higher. Thus, a high OD value is obtained as a result of the printing and further, a high speed fixing is achieved.

Moreover, in the case of the above, it is also possible to suppress feathering and print sharper dot edges by making the penetrability of the ink lower while keeping the concentration of the above surface-active agent in the mixed solution. Further, when black (k) dye or Bk pigment is used for a color material of the above-mentioned ink, it becomes possible to print characters, etc. with less feathering, higher OD value, and excellent printing quality.

Moreover, regarding the dye ink and pigment ink in the above explanation, as described above, a lower component ratio of dye or pigment may partly be contained in the pigment ink or the dye ink, respectively. This is the same with the other embodiments which will be described below. From this view point, an ink containing only dye and an ink partly containing pigment in the dye are defined as "an ink mainly with dye", while an ink containing only pigment and an ink partly containing dye in the pigment are defined as "an ink mainly with pigment."

EMBODIMENT 2

In this embodiment, two kinds of ink such as dye ink and pigment ink are prepared, and by making them coalescent on a printing medium and then adding a processing solution thereon, a mixture of three kids of solutions is obtained. And, a concentration of the surface active agent in this mixed solution corresponds to the CMC of the surface active agent in water or higher.

According in this embodiment, as the above-described embodiment 1, it becomes possible to suppress feathering and print with high OD, while achieving a high speed fixing, and furthermore, it is possible to produce an effect that each arising problem can be solved or relaxed when each of pigment ink and dye ink, and a processing solution are used for printing.

Namely, when only pigment ink and processing solution are used, a relatively strong cohesive force of the pigment generated by a reaction with the processing solution may cause the generation of "cracks" or the like in the fixed color agent, however, in the case of this embodiment, high viscosity reactant of the dye being reacted with the processing solution at the same time fills the "cracks" so that they cannot be recognized. On the other hand, when only dye ink and processing solution are used, it is possible to improve the OD value by keeping the reactants of the processing solution and the dye primarily on the surface of the printing medium, however, an increase in OD value is not possible in many cases depending on the characteristics of the dye itself. In the case of this embodiment, however, the inventor of the present invention has confirmed that OD value becomes higher by such a presumed action, so that as the dye reactants react with the processing solution they incorporate cohesive substances to become relatively large particles, and thus, more particles of pigment remain on the surface of the printing medium.

Moreover, regarding the order of putting dye ink and pigment ink, any order produces the effect described above.

EMBODIMENT 3

In this embodiment, an ink containing both dye and pigment and a processing solution are made coalescent on a printing medium, and a concentration of the surface active agent of the mixed ink corresponds in CMC of the surface active agent in water or higher.

In this case, it is possible to produce the same effect as that in the embodiment 2 described above, wherein the dye ink and the pigment ink were used individually.

EMBODIMENT 4

This embodiment replaces the pigment ink in the above embodiment 2 with an ink without dispersing agent. In this case, in addition to the effect common to the embodiments in accordance with the present invention and the effect in the embodiment 2 described above, it becomes possible to suppress "seepage" of fine reacted particles of cohesive substances that are generated when an ink without dispersing agent and processing solution is used. In the case of this embodiment, the application of the present invention assumes that this is because the high viscosity substances of the simultaneously reacted dye take in the above-mentioned particles for suppressing the "seepage".

EMBODIMENT 5

This embodiment corresponds to a case wherein an ink mixed with dye and pigment beforehand does not contain dispersing agent for the pigment in the embodiment 3.

In the case, an effect similar to that in the embodiment 4 can basically be obtained.

EMBODIMENT 6

This embodiment relates to the order of applying ink and processing solution, and combinations of each ink and processing solution are applicable to this embodiment.

For example, when printing is performed by using three droplets of dye ink, ink without dispersing agent, and processing solution, the inks or the processing solution are applied in order of dye ink, processing solution, and ink without dispersing agent, or in order of ink without dispersing agent, processing solution, and dye ink. Namely, the processing solution is added between the two inks added, and they are mixed on the printing medium to make the concentration of the surface active agent in their mixed solution correspond to the CMC of the surface active agent or higher.

In this case, it becomes possible to perform high quality printing with relatively high OD value and suppressed feathering.

The following are the descriptions on detailed examples of the image-forming apparatus to which the above embodiments are applicable.

EXAMPLE 1

Figure 5:
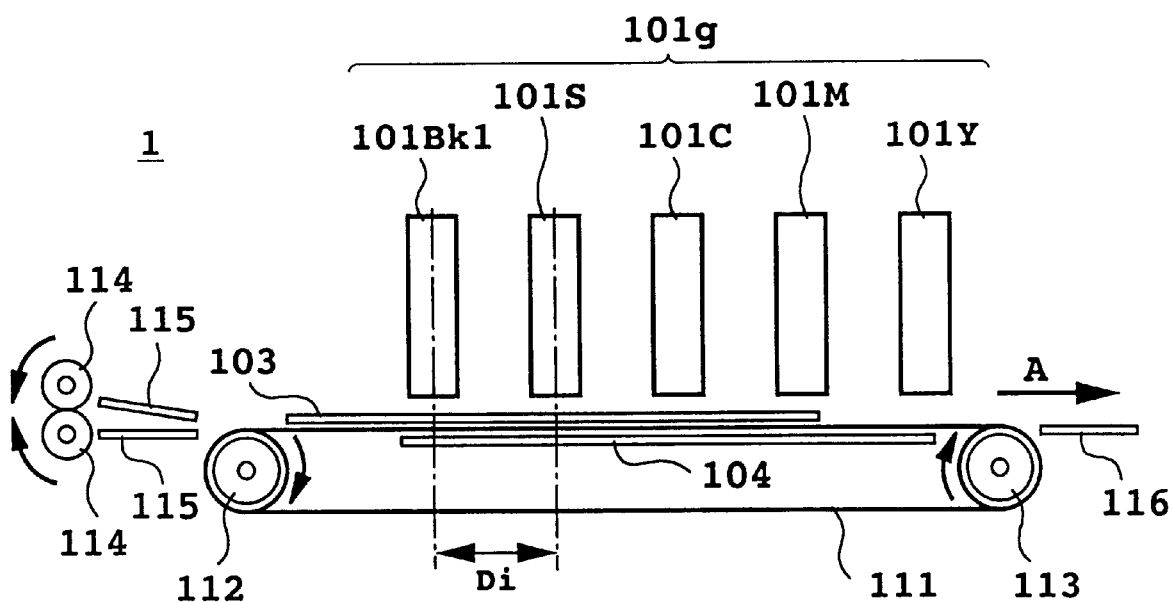
FIG. 5 is a cross-sectional view showing a schematic arrangement of an ink-jet printer related to an embodiment in accordance with the present invention.

FIG. 5 is a cross sectional view showing a schematic configuration of a full line type printer relating to the example 1.

This printer 1 adopts an ink-jet printing system to perform printing by discharging or ejecting ink or processing solution from a plurality of full line type printing heads arranged at predetermined positions along a conveying or feeding direction of a recording medium as a printing medium, and operates by being controlled by the control circuit in FIG. 6 which will be described later.

Each of the printing heads 101Bk, 101S, 101C, 101M, and 101Y of a head group 101g has about 7200 ink discharging portions or nozzles arrayed in the width direction (perpendicular to this figure) of the recording paper conveyed in the direction of A in the figure, and can operate printing on a recording paper up to the size A3. These heads make use of thermal energy to generate bubbles in the ink, and discharge the ink or the processing solution by the pressure of the bubbles.

The recording paper 103 is conveyed in the direction of A by means of a pair of resist rollers driven by a conveyor or feed motor, and is guided by a pair of guide plates 115 and is conveyed onto a conveyor belt 111 after registration of the tip edge of the paper. The endless conveyor belt 111 is borne by two rollers 112, 113, and a vertical deviation on the upper part of the belt is restricted by a platen 104. The roller 113 is driven to rotate and the recording paper 103 is thereby conveyed. Moreover, retention of the recording paper 103 to the conveyor belt 111 is done by means of electrostatic attraction. The roller 113 is driven to rotate in the direction of conveying the recording paper in the direction of the arrow A. The recording paper 103 printed thereon by the printing head group 101g is ejected onto a storage tray 116.

Each head o the recording head group 101g is comprised of the black dye ink head 101Bk, the processing solution head 101S for discharging the processing solution, each color ink head (a cyan head 101C, a magenta head 101M, and a yellow head 101Y) is arranged along the conveying direction A of the recording paper 103 as shown in the figure. Here, one discharging portion of the dye ink head 101Bk has a discharging amount of 30 pl, and that of each of the other heads has a discharging amount of 15 pl. And, it becomes possible to print black characters and colored images by discharging each color of ink and processing solution from each printing head.

Figure 6:
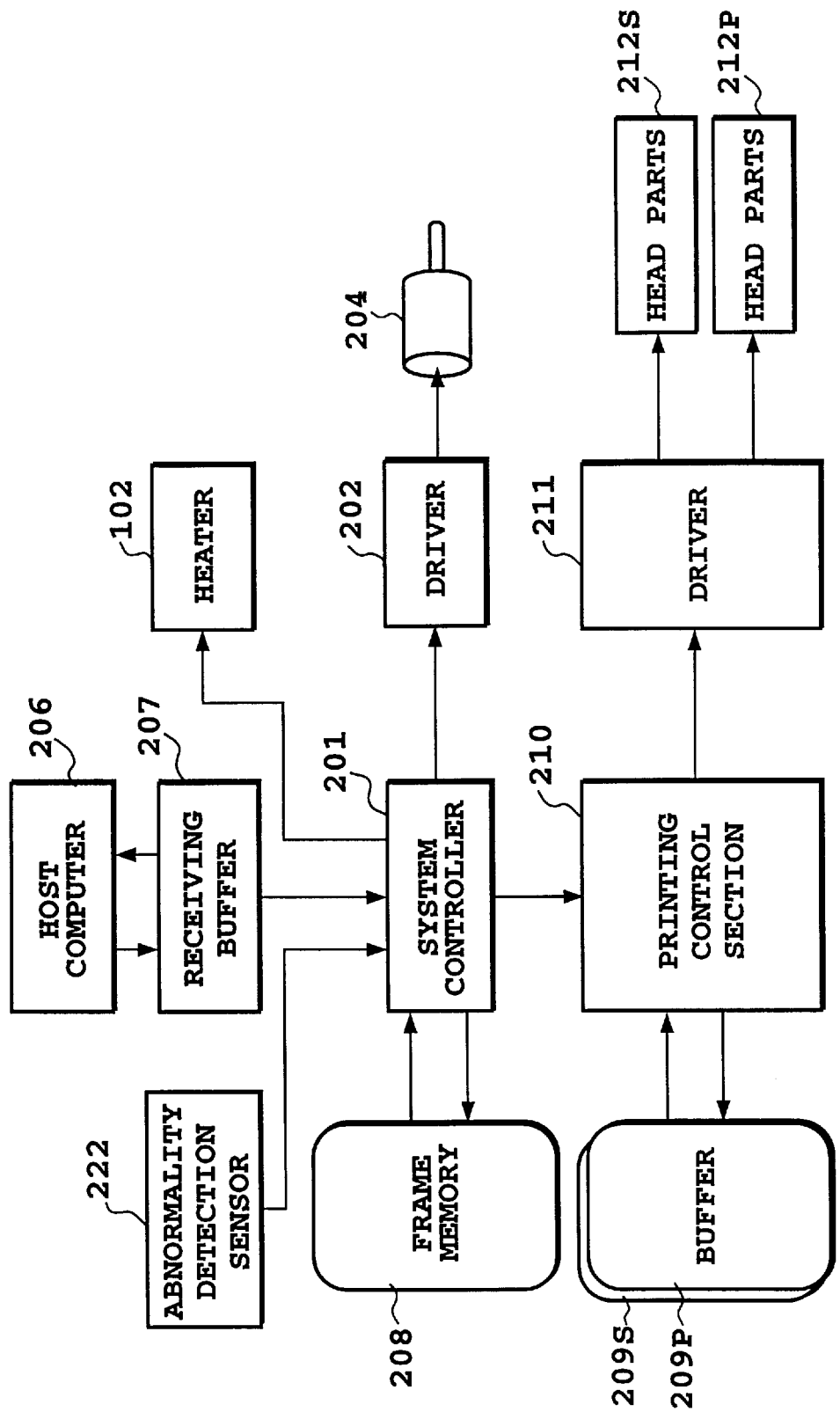
FIG. 6 is a block diagram showing an example of a control system arrangement of the above-mentioned ink-jet printer.

FIG. 6 is a block diagram showing a control configuration of the full line type printer 1 illustrated in FIG. 5.

A system controller 201 has a micro processor, a ROM for storing a control program executed in this printing apparatus, a RAM used as a work area when the micro processor operates processing, etc., and executes the control of the entire printing apparatus. A motor 204 is controlled in the driving via a driver 202, and rotates the roller 113 shown in FIG. 5 to convey the recording paper.

A host computer 206 transfers information to be printed to the printer 1 in accordance with this example, and controls its printing operation. A receiving buffer 207 temporarily stores data from the host computer 206 to keep it therein until a system controller 201 reads the data. A frame memory 208 is a memory for expending printing data into image data, and has enough memory capacity for printing. This example is described assuming that the frame memory 208 has a memory capacity permitting the storage of data for a sheet of recording paper, however, the present invention is not to be restricted by a capacity of the frame memory.

Buffers 209S, 209P are for temporarily storing data to be printed, and their memory capacities are variable depending on the number of the nozzles of the printing heads. A printing control part 210 is for properly controlling drives of the printing heads according to the instructions from the system controller 201, and controls a driving frequency, the number of printing data, etc., and also creates data for making the processing solution be discharged. A driver 211 drives a head part 212S as the printing head 101S for discharging the processing solution and a head part 212P including the printing heads 101Bk, 101C, 101M, 101Y for discharging each ink, and is controlled according to signal from the printing control part 201.

In the above configuration, the printing data are transferred from the host computer 206 to the receiving buffer 207 for being temporarily stored therein. Next, the stored printing data are read by the system controller 201 and expanded to the buffers 209S, 209P. Further, it is possible to detect paper-jamming, ink-exhaustion, paper-out, etc. by means of each detection signal from abnormality detection sensors.

The printing control part 210 creates data for the processing solution for discharging it, based on the image data expanded to the buffer 209S, 209P, and controls printing actions of each printing head based on the printing data in each buffer 209S, 209P and the data for the processing solution.

In this example, a low penetration speed ink, namely, poorly permeable ink shown in Table 1, is used for the black dye ink to be discharged from the head 101Bk, and each high penetration speed processing solution and ink, namely, the high penetrability ink shown in Table 1 is used for each processing solution, cyan ink, magenta ink and yellow ink discharged from the heads 102S, 101C, 101M, 101Y.

Compositions of processing solutions and each ink used in this example are as the following. Here, the contents shown below are indicated by pts. wt.

| [processing solution] | |
|---|---|
| Glycerin | 7 pts. wt. |
| Diethylene glycol | 5 pts. wt. |
| Acetylenol EH | 2.1 pts. wt. |

(made by Kawaken Fine Chemical Co., Ltd.)

| Poly-allylamine | 4 pts. wt. |
|---|---|
| (molecular weight: 1500 or less, mean molecular weight: about 1000) | |
| acetic acid | 4 pts. wt. |
| Benzalkonium chloride | 0.5 pts. wt. |
| Tri-ethylene glycol mono-butyl ether | 3 pts. wt. |
| Water | Remainder |
| [Yellow (Y) ink] | |
| C. I. Direct yellow 86 | 3 pts. wt. |
| Glycerin | 5 pts. wt. |
| Diethylene glycol | 5 pts. wt. |
| Acetylenol EH | 1 pts. wt. |

(made by Kawaken Fine Chemical Co., Ltd.)

| Water | Remainder |
|---|---|
| [Magenta (M) ink] | |
| C. I. Acid red | 3 pts. wt. |
| Glycerin | 5 pts. wt. |
| Diethylene glycol | 5 pts. wt. |
| Acetylenol EH | 1 pts. wt. |

(made by Kawaken Fine Chemical Co., Ltd.)

| Water | Remainder |
|---|---|
| [Cyan (C) ink] | |
| C. I. Direct Blue 199 | 3 pts. wt. |
| Glycerin | 5 pts. wt. |
| Diethylene glycol | 5 pts. wt. |
| Acetylenol EH | 1 pts. wt. |

(made by Kawaken Fine Chemical Co., Ltd.)

(made by Kawaken Fine Chemical Co., Ltd.)

| Water | Remainder |
|---|---|
| [Black (Bk) dye ink] | |
| Food Black 2 | 4 pts. wt |
| Glycerin | 7.5 pts. wt. |
| Diethylene glycol | 7.5 pts. wt. |
| Urea | 7.5 pts. wt. |
| Water | Remainder |

In the example, the nozzles of each printing head are arrayed at a concentration of 600 dpi (dots per inch), and further, operates printing at a concentration of 600 dpi in the direction of the recording paper conveyance. Thus, the dot concentration of an image, printed in accordance with this example, is 600 dpi in both row and column direction. Further, since the discharging frequency of each head is 4 kHz, the conveyance speed of the recording paper is about 170 mm/sec. Moreover, a distance Di (refer to FIG. 5) between the dye ink head 101Bk and the processing solution head 101S is 40 mm, therefore, it takes about 0.24 sec from discharging of the black dye ink on a position until discharging of the processing solution on the position.

In the above configuration, 30 pl of dye Bk ink is discharged from the head 101Bk, and then 15 pl of the processing solution is discharged from the head 101S, to form one black dot. In this case, since the antecedently discharged dye ink is a poorly permeable ink, it penetrates little into the recording paper and about 45 pl of the mixed solution is formed when the processing solution is deposited onto the antecedently landed ink. In this case, the acetylenol contents (wt. %) of the Bk ink and the processing solution before mixing are 0% and 2.1% respectively, while the content (wt. %) of acetylenol, surface active agent of the mixed solution, becomes 0.7%. Thus, the above mixed solution becomes a high penetrability ink, which is fixed quickly. Further, the mixed solution has then about 5.0 $(ml/m^2 \cdot msec^{1/2})$ of Ka valve and about 33 dyne/cm of surface active tension.

When 100% duty printing, which is called "solid printing", was performed, the fixing time was about 1 second after discharging of the processing solution.

EXAMPLE 2

This example is different from the above example 1 in the point that a pigment ink Bk without dispersing agent is discharged from the head 101 Bk shown in FIG. 5.

In this example, discharging amount per one nozzle of the head 101 Bk is 30 pl as in the above example 1, and discharging amount of the processing solution is also 15 pl as in the above. However, each acetylenol content of the Bk ink and the processing solution is 0.2% and 1.7%, respectively. Thus, the acetylenol content becomes 0.7% when they are mixed on the recording paper, and this mixed solution shows a high penetrability and is fixed quickly.

Also in this example, a printing method similar to the above was employed for fixing time measurement, and similarly, one second was obtained for the fixing time.

The above-mentioned pigment Bk ink without dispersing agent is described the following.

For a pigment used for this example, a self-dispersion type pigment is used, to which at least a kind of anionic group is bonded to carbon black surface directly or via other atomic group, but for a color material, a self-dispersion type carbon black is used, to which at least a kind of hydrophilic group is bonded directly or via other atomic group. This results in eliminating the need for a dispersing agent to disperse carbon black, which is required for conventional ink. For the use in this example, ionized self-dispersing type carbon black is desirable, and anionically electrified carbon black is suitable.

In the case of anionically electrified carbon black, for example, —COOM, —SO$_3$M, —PO$_3$HM, —PO$_3$M$_2$, SO$_2$NH$_2$, —SO$_2$NHCOR, etc. can be mentioned as a hydrophilic group bonded to the surface (wherein M in the formulae represents hydrogen atom, alkaline metal, ammonium or organic ammonium, and R represents an alkyl group with 1 to 12 carbon atoms, a phenyl group which is allowed to have substituent, or a naphtyl group which is allowed to have substituent). In this example, especially among the above groups, such carbon black is preferably used, and is bonded with —COOM or —SO$_3$M on the surface of the carbon black and is anionically electrified.

Also, for "M" of the above-mentioned hydrophilic groups, for example, lithium, sodium, potassium, etc. can be mention as an alkaline metal, and for organic ammonium, mono-, di- or tri-methyl ammonium, mono-, di- or tri-ethyl ammonium, mono-, di- or tri-methanol ammonium, etc. can be mentioned. As a method of obtaining anionically electrified carbon black, namely, a method of introducing —COONa onto the surface of carbon black, for example, such a method can be mentioned as carbon black is treated with sodium hypochlorite by oxidation, however, it is obvious that the present invention is not to be restricted by this method.

Pigment Bk ink has the following composition.

| [Black Bk pigment ink] | |
| --- | --- |
| Pigment dispersing solution | 50 pts. wt. |
| Glycerin | 7 pts. wt. |
| Tri-ethylene glycol | 7 pts. wt. |
| Acetylenol | 0.2 pts. wt. |
| (made by Kawaken Fine Chemical Co., Ltd.) | |
| Water | Remainder |

The above-mentioned pigment dispersing solution is as follows.

[Pigment dispersing solution]

At 5° C., 1.58 g anthranilic acid was added into a solution in which 5 g concentrated hydrochloric acid is dissolved in 5.3 g water. This solution was always kept at 10° C. or the less, by being stirred in an ice bath, and another solution having 1.78 g sodium nitrite dissolved in 8.7 g water was added to that solution. Further, after 15 minutes stirring, 20 g carbon black, of which oil absorption is 120 ml/100 g DBP and a surface area is 320 m$^2$/g, was added to the former solution in a mixed state. And then, the mixture was stirred for another 15 minutes. The obtained slurry was filtered by Toyo Filter Paper No. 2 (made by Advantis, Ltd.), and after the pigment particles were sufficiently rinsed and dried in an oven at 110° C., water was added to the pigment for making 10 wt. % pigment aqueous solution. By this method, a pigment dispersing solution was obtained as expressed by the formula below, in which anionically electrified self-dispersed type carbon black bonded to hydrophilic group via a phenyl group is dispersed on the surface.

[Chemical Formula 1]

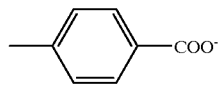

EXAMPLE 3

Figure 7:
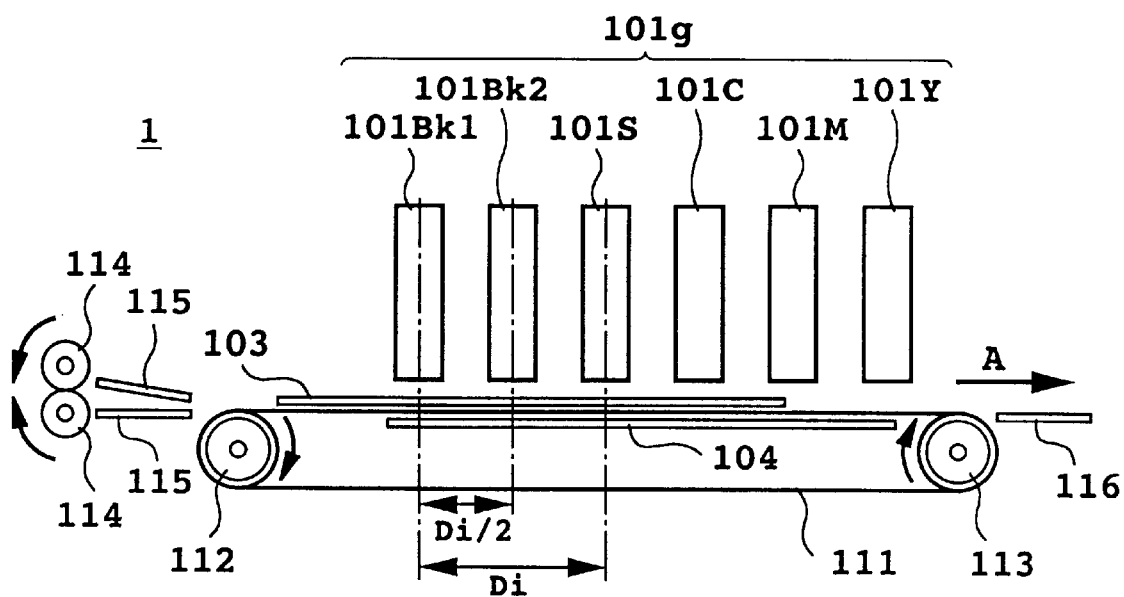
FIG. 7 is a cross-sectional view showing a schematic arrangement of an ink-jet printer related to another embodiment in accordance with the present invention.

In this example, two heads are used with Bk ink, and are configured to discharge dye ink and pigment ink, respectively. FIG. 7 is a schematic sectional view showing a printing apparatus relating to this example.

A head 101Bk1 discharges 15 pl dye Bk ink per each nozzle, and a head 101Bk2 discharges 15 pl pigment Bk ink per each nozzle. Also, a processing solution head 101S discharges 15 pl processing solution per each nozzle. And, these dye Bk ink, pigment Bk ink, and processing solution contain 0%, 0.2%, and 1.9% acetylenol, respectively.

According to the above composition, when a dot of Bk ink is formed in printing, the above-mentioned dye Bk ink, pigment Bk ink, and processing solution are made coalescent on the recording paper 103, and as a result, the acetylenol content of the mixed solution becomes 0.7%, and the mixed solution becomes highly penetrative.

EXAMPLE 4

In this example, the order of discharging the pigment ink and dye ink is reversed compared with the above example 3. Namely, in FIG. 7, the head 101Bk1 discharges pigment ink, and the head 101Bk2 discharges dye ink. In this case also, an effect similar to that from the above example 3 can be achieved.

EXAMPLE 5

In this example, one head is provided for Bk ink as shown in FIG. 5, and this head discharges a mixed ink of dye Bk ink and pigment Bk ink. The discharging amount of this head is 30 pl containing 0.1% acetylenol, while 15 pl processing solution is discharged as in each example described above but 0.9% acetylenol is contained. Thus, acetylenol content of a mixed solution of the mixed Bk ink and the processing solution becomes 0.7%.

This mixed Bk ink has the following composition.

| [Mixed Bk ink] | |
| --- | --- |
| Pigment dispersing solution | 25 pts. wt. |
| Food black 2 | 2 pts. wt. |
| Glycerin | 6 pts. wt. |
| Tri-ethylene glycol | 5 pts. wt. |
| Acetylenol EH | 0.1 pts. wt. |
| (made by Kawaken Fine Chemical Co., Ltd.) | |
| Water | Remainder |

According to this example, an effect similar to that from the above-described examples 3 and 4 can be achieved.

EXAMPLE 6

In this example, Bk ink is provided with two heads, one of which discharges 15 pl dye ink per each nozzle and the other discharges 15 pl pigment ink per each nozzle, respectively, and processing solution is also provided with two heads, of which each discharges 8 pl processing solution per each nozzle. By this configuration, discharging is carried out in order of dye Bk ink, pigment Bk ink, processing solution, and processing solution and they form a coalescent solution.

Here, acetylenol contents of each solution are 0%, 0.2%, 0.2%, and 3.6% in the above discharging order, and as a result, an acetylenol content of the coalescent solution becomes 0.7%. Thus, high fixation can be achieved. In addition to this, in this example, the later the discharging order is, the higher penetrability the solution has, therefore, it is possible to coalesce the preceding discharged solution and the following solution before penetration of the preceding solution, and this coalescence can make the penetrability of the mixed solution higher.

FURTHER EXAMPLES

In each example described above, the compositions of Bk ink to improve its fixation have been described as preferred embodiments of the present invention, however, application of the present invention is not to be restricted by the above. For example, in a case of mixing processing solutions with color inks regarding each color ink, or intermixing light and dark inks regarding a same color, the present invention is applicable thereto. For example, when color printing is performed by using Y, M, and C inks, Y-ink, of which an improvement in concentration is not so much desired, is made a highly permeable ink while other inks are made as poorly permeable inks, and thus, it is thereby possible to provide the mixture with a predetermined acetylenol content when they are mixed.

Moreover, in the above examples 1 and 2, dye ink or pigment ink was made to be discharged 30 pl from one head per each nozzle, however, the same effect can be also obtained if two heads discharge 15 pl of the ink per nozzle respectively.

Moreover, in the above examples, pigment ink without dispersing agent has been described, however, it is obvious that pigment ink with dispersing agent may also be used. Further, each of the dye ink and the pigment ink may partly contain pigment and dye in lower concentrations than the other, respectively.

Further, in each example of the above, the configuration may be such as a highly penetrative processing solution is discharged before Bk ink is further discharged.

Figure 8:
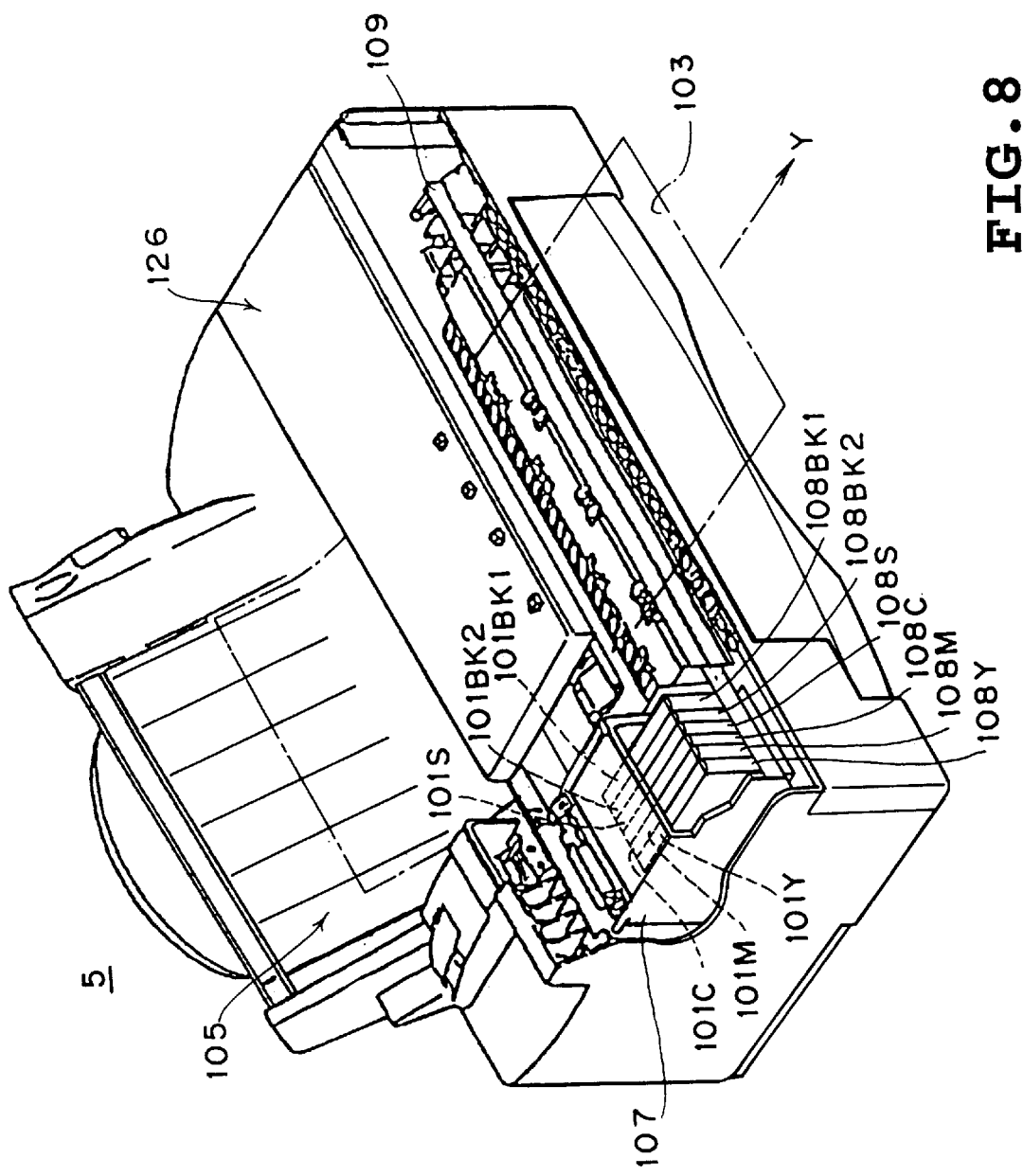
FIG. 8 is a perspective illustration showing an arrangement of an ink-jet printer related a further embodiment in accordance with the present invention.

Further, applicability of the present invention is not to be restricted to a full line type printer as shown in each example of the above, but the invention is applicable to a serial type printer as shown in FIG. 8.

FIG. 8 is a schematic drawing showing the constitution of a serial type printer 5 relating to an example of the present invention. Namely, it is obvious that a printing apparatus, wherein dye ink and pigment ink are mixed on a printing medium before they are reacted with a processing solution, is applicable not only to the above-described full line type but also to the serial type apparatus. Here the same components as shown in FIG. 5 or FIG. 7 are marked with the same codes for omitting the detail description about them. Further, two Bk ink heads are provided in the configuration shown in the figure.

Recording paper 103 as a printing medium is inserted from a paper feeding part 105 and ejected via printing part 126. In this example, widely used inexpensive ordinary paper is used as recording paper 103. In the printing part 126, a carriage 107 is arranged to mount printing heads 101Bk1, 102Bk2, 101S, 101C, 101M, and 101Y and move back and forth along a guide rail 109 by means of a driving force of an unshown motor. The printing head 101Bk1 discharges black pigment ink, and the printing head 102Bk2 discharges black dye ink. The printing heads 101S, 101C, 101M, and 101Y discharge processing solution, cyan ink, magenta ink, yellow ink, respectively, and are driven in this order to discharge ink or processing solution on a sheet of the recording paper 103. Moreover, the black pigment ink is an ink without dispersing agent.

To each head, ink or processing solution is supplied from each tank 108Bk1, 108Bk2, 108S, 108C, 108M and 108Y, respectively. In discharging state, a driving signal is supplied to an electro-thermal transducer of a heater disposed at each nozzle of each head, and then thermal energy acts on the ink or processing solution to generate a bubble therein, thereby ink or processing solution is discharged by the pressure of the bubble. Each head has 64 discharging portions or nozzles arrayed at 360 DPI in the direction substantially the same as the direction of conveying the recording paper 103, that is, the nozzles are arrayed in the direction perpendicular to the scanning direction of each head. Here, the discharging amount per one nozzle is 23 pl.

In the above arrangement, each head is arranged at ½ inch intervals, and has a printing concentration of 720 dpi in the scanning direction and a discharging frequency of 7.2 kHz.

Further, in each example of the above, the discharging system of each head makes use of thermal energy to discharge ink or processing solution, however, the present invention does not restrict this applicability but, for example, a system using a piezo-element may be applicable.

Furthermore, in each example of the above, it is assumed that basically, the later the discharging order is, the higher penetrability the ink or processing solution has, therefore, the precedent discharging ink penetrates little into recording paper before the following ink is discharged. However, for example, when a high penetrability ink is adopted for Y-ink as described above and color printing is performed by discharging this ink precedently, Y-ink penetrates into the paper to some extent before the following inks are discharged. Therefore, in such a case, a discharging rate and discharging intervals of Y-ink discharged at the same time have only to be determined so that acetylenol content becomes a percentage showing the predetermined high penetrability described above to the total solution volume at the time when the succeeding ink is discharged and mixed.

As being apparent from the above descriptions, according to the present invention, a plurality of different droplets of ink, processing solution, etc. coalesce into one droplet and its critical micell concentration, surface tension, and Ka value, which represent the penetrability of the droplet, becomes a predetermined value of high penetrability or higher, therefore, the penetration is accelerated as a droplet after coalescence even if not all the droplets have high penetrability.

Thus, even if low penetrative inks are used to improve OD value and suppress feathering, they shows a high penetrability as a coalesced ink and fixation is not inhibited.

Consequently, it is possible to achieve high fixation without using a means like a heater, etc. and improve printing quality.

The present invention has been described in detail with respect to various embodiments, and it will now be apparent from the foregoing to those skilled in the art that changes and modifications may be made without departing from the invention in its broader aspects, and it is the intention, therefore, the appended claims should be construed to cover all such changes and modifications as fall within the true spirit of the invention.

What is claimed is:

1. A method for forming an image on a printing medium comprising the step of:

forming an image by using different plural liquids;

wherein a concentration of a surface-active agent in at least one of said different plural liquids is less than the critical micell concentration of said surface-active agent in pure water, and a concentration of a surface-active agent in at least one other liquid of said different plural liquids is higher than the critical micell concentration of said surface-active agent in pure water; and wherein a concentration of a surface-active agent in a liquid on a printing medium surface, said liquid being obtained in a manner such that at least one of said different plural liquids and at least one other liquid of said different plural liquids have coalesced on the printing medium surface to form an image, is the critical micell concentration of said surface-active agent in pure water or higher.

2. A method for forming an image as claimed in claim 1, wherein said surface-active agent is ethylene oxide-2,4,7,9-tetramethyl-5-decine-4, and 7-diol, and said liquids in which the concentration of said surface-active agent is the critical micell concentration of said surface-active agents in pure water or higher, have a surface active agent content of 0.7% or higher in said liquids.

3. A method for forming an image as claimed in claim 1, wherein each of said different plural liquids is an ink containing color material.

4. A method for forming an image as claimed in claim 1, wherein said different plural liquids contain an ink having color material and a processing solution liquid that causes the color material in said ink to become insoluble, wherein said processing solution liquid is deposited onto the printing medium after at least one ink.

5. A method for forming an image as claimed in claim 3, wherein said coalesced liquid contains said color materials comprising dyes.

6. A method for forming an image as claimed in claim 3, wherein said coalesced liquid contains color materials comprising pigments.

7. A method for forming an image as claimed in claim 3, wherein said coalesced liquid contains color materials comprising dyes and pigments.

8. A method for forming an image as claimed in claim 6, wherein said coalesced liquid further contains a dispersing agent for dispersing said pigments.

9. A method for forming an image as claimed in claim 6, wherein said pigments include a self-dispersing pigment.

10. A method for forming an image on a printing medium comprising the steps of:

forming an image by using an ink having color material and having a surface tension not less than 35 dyne/cm, and a processing solution that causes the color material in said ink to become insoluble and having a surface tension less than 35 dyne/cm; and forming a coalesced liquid on a printing medium surface to form an image, by coalescing on a printing medium surface said ink and said processing solution, wherein said coalesced liquid has a surface tension less than 35 dyne/cm.

11. A method for forming an image as claimed in claim 10, wherein said coalesced liquid contains color materials comprising dyes.

12. A method for forming an image as claimed in claim 10, wherein said coalesced liquid contains color materials comprising pigments.

13. A method for forming an image as claimed in claim 10, wherein said coalesced liquid contains color materials comprising dyes and pigments.

14. A method for forming an image as claimed in claim 12, wherein said coalesced liquid further contains a dispersing agent for dispersing said pigments.

15. A method for forming an image as claimed in claim 12, wherein said pigments include a self-dispersing pigment.

16. A method for forming an image on a printing medium comprising the step of:

forming an image by using different plural liquids;

wherein a Ka value of at least one of said different plural liquids is not less than 5 $\{ml/m^2 \cdot msec^{1/2}\}$, and a Ka value of at least one other of said different plural liquids is less than 5 $\{ml/m^2 \cdot msec^{1/2}\}$;

wherein the Ka value of a penetration speed of a liquid on a printing medium surface, said liquid being obtained in such a manner that at least one of said different plural liquids and at least one other liquid of said different plural liquids have coalesced on the printing medium surface to form an image, is not less than 5 $\{ml/m^2 \cdot msec^{1/2}\}$.

17. A method for forming an image as claimed in claim 16, wherein each of said different plural liquids is an ink containing color material.

18. A method for forming an image as claimed in claim 17, wherein said different plural liquids contain an ink having color material and a processing solution liquid that causes the color material in said ink to become soluble, wherein said processing solution liquid is deposited onto the printing medium after at least one ink.

19. A method for forming an image as claimed in claim 17 wherein said coalesced liquid contains color materials comprising dyes.

20. A method for forming an image as claimed in claim 17 wherein said coalesced liquid contains color materials comprising pigments.

21. A method for forming an image as claimed in claim 17 wherein said coalesced liquid contains color materials comprising dyes and pigments.

22. A method for forming an image as claimed in claim 20 wherein said coalesced liquid further contains a dispersing agent for dispersing said pigments.

23. A method for forming an image as claimed in claim 20, wherein said pigments include a self-dispersing pigment.

24. A method for forming an image comprising the step of:

forming an image by adding at least one ink before adding a processing solution to insolubilize color materials in said ink;

wherein a concentration of a surface-active agent in at least one of said ink and said processing solution is less than the critical micell concentration of said surface-active agent in pure water, and a concentration of a surface-active agent in at least one other of said ink and said processing solution is higher than the critical micell concentration of said surface-active agent in pure water; and wherein a concentration of the surface-active agent in a liquid, into which said at least one ink and said processing solution have coalesced on a surface of a printing medium to form an image, is not less than the critical micell concentration of said surface-active agent in pure water.

25. A method for forming an image comprising the step of:
   forming an image by adding an ink before adding a processing solution to insolubilize color materials in said ink;
   wherein the surface tension of said processing solution is less than 35 dyne/cm, and the surface tension of said ink is not less than 35 dyne/cm; and
   wherein a surface tension of a liquid into which said ink and said processing solution have coalesced on a surface of a printing medium to form an image, is less than 35 dyne/cm.

26. A method for forming an image comprising the step of:
   forming an image by adding at least one ink before adding a processing solution to insolubilize color materials in said ink;
   wherein a Ka value of at least one of said ink and said processing solution is not less than 5 $\{ml/m^2 \cdot msec^{1/2}\}$, and a Ka value of at least one other of said ink and said processing solution is less than 5 $\{ml/m^2 \cdot msec^{1/2}\}$,
   wherein Ka value indicating a penetration speed of a liquid into which said at least one ink and said processing solution have coalesced on a surface of a printing medium to form an image, is not less than 5 $\{ml/m^2 \cdot msec^{1/2}\}$.

27. A method for forming an image comprising the step of:
   forming an image by adding at least one ink before adding a processing solution to insolubilize color materials in said ink and then, further adding at least another ink;
   wherein a concentration of a surface-active agent in at least one of said ink and said processing solution is less than the critical micell concentration of said surface-active agent in pure water, and a concentration of a surface-active agent in at least one other of said ink and said processing solution is higher than the critical micell concentration of said surface-active agent in pure water; and
   wherein a concentration of the surface-active agent in a liquid, into which said at least one ink and said processing solution have coalesced on a surface of a printing medium to form an image, is not less than the critical micell concentration of said surface-active agent in pure water.

28. A method for forming an image comprising the steps of:
   adding a first ink comprising color materials and having a surface tension not less than 35 dyne/cm,
   adding a processing solution to insolubilize color materials in said first ink, said processing solution having a surface tension less than 35 dyne/cm,
   adding a second ink having a surface tension not less than 35 dyne/cm;
   forming a coalesced liquid having a surface tension less than 35 dyne/cm on a surface of a printing medium, by coalescing said first ink, said processing solution and said second ink on said printing medium.

29. A method for forming an image comprising the step of:
   forming an image by adding at least one ink before adding a processing solution to insolubilize color materials in said ink and then, further adding at least another ink;
   wherein a Ka value of at least one of said ink and said processing solution is not less than 5 $\{ml/m^2 \cdot msec^{1/2}\}$, and a Ka value of at least one other of said ink and said processing solution is less than 5 $\{ml/m^2 \cdot msec^{1/2}\}$;
   wherein the Ka value of a penetration speed of a liquid into which said at least one ink and said processing solution have coalesced on a surface of a printing medium to form an image, is not less than 5 $\{ml/m^2 \cdot msec^{1/2}\}$.

30. An image forming apparatus comprising:
   means for forming an image having discharging portions for discharging different plural liquids, wherein the liquids are discharged onto a printing medium from said discharging portions;
   wherein a concentration of a surface-active agent in at least one of said different plural liquids is less than the critical micell concentration of said surface-active agent in pure water, and a concentration of a surface-active agent in at least one other liquid of said different plural liquids is higher than the critical micell concentration of said surface-active agent in pure water; and
   wherein the concentration of the surface-active agent in the liquid, into which said different plural liquids have coalesced on the surface of the printing medium to form an image, is not less than the critical micell concentration of said surface-active agent in pure water.

31. An image forming apparatus comprising:
   means for forming an image having discharging portions for discharging ink and processing solution, wherein said ink and said processing solution are discharged onto a printing medium from said discharging portions;
   wherein the surface tension of said processing solution is less than 35 dyne/cm, and the surface tension of said ink is not less than 35 dyne/cm; and
   wherein the surface tension of the liquid, into which said processing solution and said ink have coalesced on the surface of the printing medium to form an image, is less than 35 dyne/cm.

32. An image forming apparatus comprising:
   means for forming an image having discharging portions for discharging different plural liquids, wherein the liquids are discharged onto a printing medium from said discharging portions;
   wherein a Ka value of at least one of said different plural liquids is not less than 5 $\{ml/m^2 \cdot msec^{1/2}\}$, and a Ka value of at least one other of said different plural liquids is less than 5 $\{ml/m^2 \cdot msec^{1/2}\}$;
   wherein the Ka value of a penetration speed of a liquid on a printing medium surface, said liquid being obtained in such a manner that at least one of said different plural liquids and at least one other liquid of said different plural liquids and at least one other liquid of said different plural liquids having coalesced on the printing medium surface to form an image, is not less than 5 $\{ml/m^2 \cdot msec^{1/2}\}$.

33. A method for forming an image as claimed in claim 1, further including a step of generating thermal energy using a printing head having one or more heating elements, wherein the thermal energy causes the liquids to film-boil, thus causing the liquids to be ejected.

34. A method for forming an image as claimed in claim 10, further including a step of generating thermal energy using a printing head having one or more heating elements, wherein the thermal energy causes the liquids to film-boil, thus causing the liquids to be ejected.

35. A method for forming an image as claimed in claim 16, further including a step of generating thermal energy using a printing head having one or more heating elements, wherein the thermal energy causes the liquids to film-boil, thus causing the liquids to be ejected.

36. A method for forming an image as claimed in claim 24, further including a step of generating thermal energy using a printing head having one or more heating elements, wherein the thermal energy causes the liquids to film-boil, thus causing the liquids to be ejected.

37. A method for forming an image as claimed in claim 25, further including a step of generating thermal energy using a printing head having one or more heating elements, wherein the thermal energy causes the liquids to film-boil, thus causing the liquids to be ejected.

38. A method for forming an image as claimed in claim 26, further including a step of generating thermal energy using a printing head having one or more heating elements, wherein the thermal energy causes the liquids to film-boil, thus causing the liquids to be ejected.

39. A method for forming an image as claimed in claim 27, further including a step of generating thermal energy using a printing head having one or more heating elements, wherein the thermal energy causes the liquids to film-boil, thus causing the liquids to be ejected.

40. A method for forming an image as claimed in claim 28, further including a step of generating thermal energy using a printing head having one or more heating elements, wherein the thermal energy causes the liquids to film-boil, thus causing the liquids to be ejected.

41. A method for forming an image as claimed in claim 29, further including a step of generating thermal energy using a printing head having one or more heating elements, wherein the thermal energy causes the liquids to film-boil, thus causing the liquids to be ejected.

42. An image forming apparatus as claimed in claim 30, further comprising a printing head having one or more heating elements for generating thermal energy, wherein the thermal energy causes the liquids to film-boil, thus causing the liquids to be ejected.

43. An image forming apparatus as claimed in claim 31, further comprising a printing head having one or more heating elements for generating thermal energy, wherein the thermal energy causes the liquids to film-boil, thus causing the liquids to be ejected.

44. An image forming apparatus as claimed in claim 32, further comprising a printing head having one or more heating elements for generating thermal energy, wherein the thermal energy causes the liquids to film-boil, thus causing the liquids to be ejected.

* * * * *

UNITED STATES PATENT AND TRADEMARK OFFICE
CERTIFICATE OF CORRECTION

PATENT NO.    : 6,379,000 B1
DATED         : April 30, 2002
INVENTOR(S)   : Noribumi Koitabashi It is certified that error appears in the above-identified patent and that said Letters Patent is hereby corrected as shown below:

<u>Title page,</u>
Item [56], References Cited, FOREIGN PATENT DOCUMENTS, "02055184 A" should read -- 02-055184 A --.

<u>Column 1,</u>
Line 33, "the" should be deleted.

<u>Column 3,</u>
Line 7, "on" should be deleted.
Line 8, "solution" should read -- solution droplets --, and "printing have" should be deleted.
Line 9, "coalesced on a surface of a" should be deleted.

<u>Column 4,</u>
Line 16, "an image" ($2^{nd}$ occurrence) should be deleted.
Line 42, "etc." should be deleted.
Line 60, "a" should read -- to a --.

<u>Column 5,</u>
Line 4, "elapsed," should read -- elapsed time, --.

<u>Column 6,</u>
Line 10, "comprises" should read -- comprise --.

<u>Column 7,</u>
Line 57, "was" should be deleted.
Line 58, "prepared" and "was prepared" should be deleted.

<u>Column 8,</u>
Line 3, "The" should read -- This --.
Line 18, "(k)" should read -- (Bk) --.
Line 37, "kids" should read -- kinds --.

<u>Column 13,</u>
Line 3, "mention" should read -- mentioned --.

UNITED STATES PATENT AND TRADEMARK OFFICE
CERTIFICATE OF CORRECTION

PATENT NO. : 6,379,000 B1
DATED : April 30, 2002
INVENTOR(S) : Noribumi Koitabashi It is certified that error appears in the above-identified patent and that said Letters Patent is hereby corrected as shown below:

Column 16,
Line 59, "shows" should read -- show --.

Signed and Sealed this

Twenty-seventh Day of May, 2003

JAMES E. ROGAN
*Director of the United States Patent and Trademark Office*